No. 742,051. PATENTED OCT. 20, 1903.
J. A. NEESE.
FERTILIZER DISTRIBUTER.
APPLICATION FILED JUNE 13, 1903.
NO MODEL. 2 SHEETS—SHEET 1.
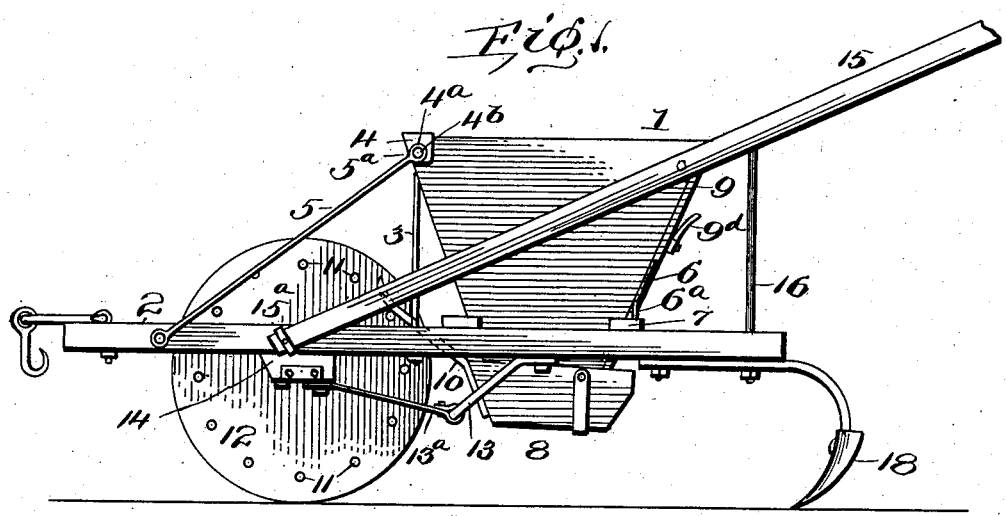
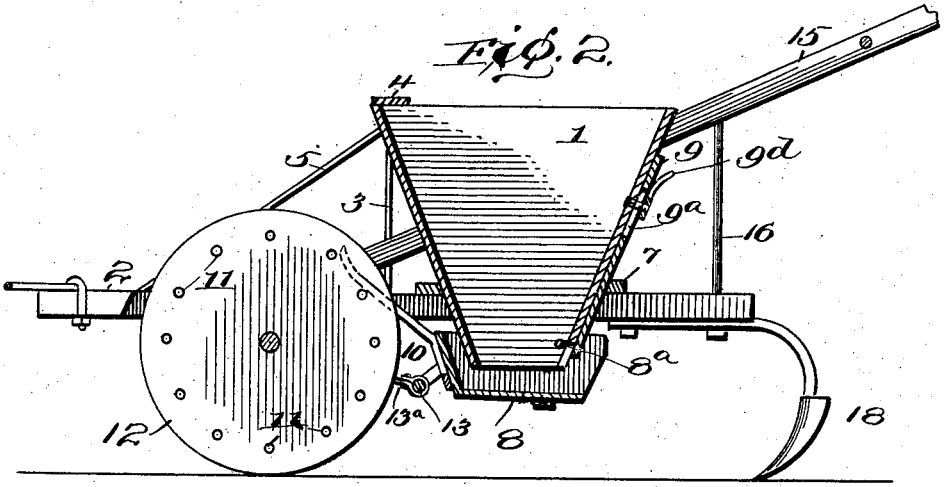
Witnesses
Inventor
John A. Neese
By Attorney No. 742,051. PATENTED OCT. 20, 1903.
J. A. NEESE.
FERTILIZER DISTRIBUTER.
APPLICATION FILED JUNE 13, 1903.
NO MODEL. 2 SHEETS—SHEET 2.
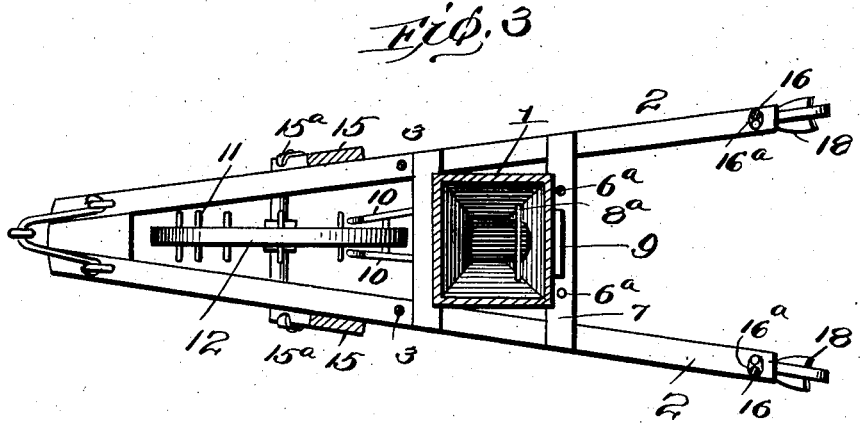
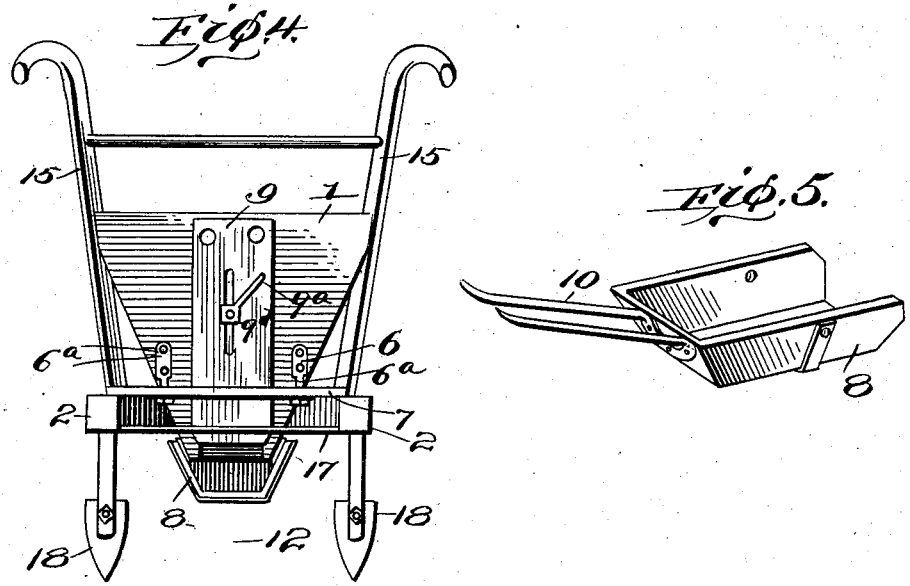
Witnesses
J. M. Fowler
William F. Gardner
Inventor
John A. Neese
By Johnston
Attorney.

No. 742,051. Patented October 20, 1903.

UNITED STATES PATENT OFFICE.

JOHN A. NEESE, OF NEESETON, SOUTH CAROLINA.

FERTILIZER-DISTRIBUTER.

SPECIFICATION forming part of Letters Patent No. 742,051, dated October 20, 1903.

Application filed June 13, 1903. Serial No. 161,322. (No model.)

*To all whom it may concern:*

Be it known that I, JOHN A. NEESE, a citizen of the United States, residing at Neeseton, in the county of Aiken and State of South Carolina, have invented new and useful Improvements in Fertilizer - Distributers, of which the following is a specification.

My invention relates to certain improvements in fertilizer-distributers.

It has for its object to effectively or thoroughly drop or deposit the fertilizer in aiding the putting of the soil in condition for proper cultivation; also, it contemplates the production of a machine which shall be simple, strong, and durable, easy and certain in operation, and readily and cheaply manufactured.

The nature of said invention consists of the combination of parts, including their construction and arrangement, substantially as hereinafter more fully disclosed, and specifically pointed out by the claims.

In the accompanying drawings, illustrating the preferred embodiment of my invention, Figure 1 is a side elevation thereof. Fig. 2 is a vertical section. Fig. 3 is a horizontal section taken just above the dropping-shoe guard or fender. Fig. 4 is a rear elevation, and Fig. 5 is a detailed perspective view of the shaking-shoe guard or fender.

It will be observed that latitude is allowed herein as to details, as they may be changed as circumstances suggest without departing from the spirit of my invention and said invention be still protected.

In carrying out my invention I employ the usual hopper 1 for holding the fertilizer secured or supported in position between two converging beams 2, to the forward ends of which beams is suitably applied the draft-clevis. The hopper has passed vertically through it near its upper front portion bracing or securing rods 3, with their lower portions passing through and nutted to said beams upon the under side and their extreme upper ends passing through and headed down upon a metal strap 4, secured upon the upper forward edge of said hopper. Said strap has downturned end portions $4^a$, through which the flattened end portions $5^a$ of rods or braces 5 pass securing-bolts $4^b$, the opposite ends of said rods or braces being bolted laterally to the beams near their forward ends. Said hopper also has secured thereto, at its rear side near the lower end, plates 6, with their lower ends terminating in bolt-like projections or extensions $6^a$, passing through a cross-bar 7, bolted to the beams, said bolt-like extensions being nutted upon the under side of said cross-bar. This series of braces or rods and bolt-like extended plates, with their adjunctive parts, fixedly or rigidly secures the hopper in place between or upon the beams.

Hung or pivoted from and beneath the lower delivery end of the hopper 1 is a shaking-shoe 8, preferably of the construction shown, this being effected, preferably, by means of a bolt $8^a$, suitably passing through said lower end of hopper and laterally through said shoe near its upper edges, so as to permit said shoe to be vibrated, as further disclosed presently. The hopper opens at its rear lower edge, as well as directly through its lower end, into said shoe, and to said hopper upon its rear side is applied a slide or valve 9, adapted to control the passage of the fertilizer or contents of the hopper through the lower or bottom edge opening of said hopper into said shoe, consequently the delivering or dropping of the fertilizer to the ground. Said valve or slide has a vertical slot $9^a$, and through said slot extends a bolt-like screw-threaded projection $9^a$, projecting from the hopper, and upon this projection or bolt is screwed or fitted a nut $9^d$, having a lever or handle $9^d$ for its actuation, as in effecting the adjustment of said valve or slide for the purpose aforesaid. Said shoe has suitably secured to its front or one end the curved or arcuate connecting portion between the arms of a substantially U-shaped lever 10, reaching upwardly and forwardly, said arms resting upon studs or projections 11, projecting laterally from the transporting or driving wheel 12, the engagement between said parts when the wheel or machine is in motion actuating the dropping or shaking shoe. Said shoe is guarded or protected from contact with any otherwise interfering influences or obstacles—such as roots, stumps, grubs, and the like—by means of a fender or casting 13, in general outline of U shape, with the upper ends of its downwardly and forwardly inclined arms secured in the beams laterally of said shoe. The connecting or cross portion between said arms has connected thereto metal straps 13ª, each preferably looped around said connecting or cross portion at their rear ends, while the forward ends of said straps are preferably bolted to the under sides of the wheel-axle bearings 14, in turn bolted to the under sides of the beams, the securing-bolts passing said bearings, beams, and straps. Thus protecting or guarding the shoe prevents the displacement of the shoe and the consequent disarrangement of its actuating or vibrating means, as the two-armed casting secured to said shoe and engaged by the carrying or transporting wheel projections or studs. The handles 15 are bolted near their lower ends laterally to the beams near their forward ends with the securing-bolts passing through clips 15ª, embracing said handles, bracing the same at that point. Said handles are also bolted to the hopper near its upper rear edge. Braces or rods 16 are bolted to the handles 15 and have at their lower ends right-angled bent portions 16ª, through which are inserted bolts passing through the beams near their rear ends and through a cross bar or strip 17, arranged upon the under side of said beams, said braces or rods, with their headed ends or nuts, thus effecting the securing of said cross-bar to the beams as well.

Furrow-closing plows or shovels 18 are carried by the beams 2 to aid the advantageous distribution of the fertilizer.

Having thus fully described my invention, what I claim, and desire to secure by Letters Patent, is—

1. A fertilizer-distributer, comprising a shaking-shoe and a fender for said shoe, of approximately U shape with its arms arranged laterally of said shoe, and means for the retention of said fender in fixed position.

2. A fertilizer-distributer, comprising a shaking-shoe and a fender for said shoe, of approximately U shape, with its arms arranged laterally of said shoe, and having connected to its yoke portion metal straps secured to the beams.

3. A fertilizer-distributer, comprising a hopper, a shaking-shoe pivoted to said hopper, at its delivery end, a lever of substantially U shape, with its curved or arcuate portion fixed to said shoe, at one end, and having upwardly and forwardly inclined arms, a carrying-wheel having lateral projections engaging said arms, and a fender also substantially U shape, with its arms fixed to the frame of the machine, and arranged laterally of said shoe, said fender having connected to its yoke portion metal straps secured to said beams.

4. A fertilizer-distributer, comprising a hopper, with its shaking-shoe, and means for actuating said shoe, said hopper having secured to its upper front edge a metal strap having lateral pendants, and braces secured to the machine-frame and to said lateral pendants.

5. A fertilizer-distributer, comprising a hopper, with its shaking-shoe, and means for actuating said shoe, said hopper having applied to its top front edge a metal strap, means connecting the lateral pendants of said metal strap to the machine-frame, and braces passed upwardly through the upper front portion of said hopper and said metal strap and headed down upon said strap, said braces being secured to the beams forming the machine-frame.

In testimony whereof I have signed my name to this specification in the presence of two subscribing witnesses.

JOHN A. NEESE.

Witnesses:
J. W. JOHNSON,
A. C. JOHNSON.